United States Patent [19]

Berkers

[11] Patent Number: 4,972,770

[45] Date of Patent: Nov. 27, 1990

[54] ROLL BALING PRESS

[75] Inventor: Anton Berkers, Heeze, Netherlands

[73] Assignee: P. J. Zweegers en Zonen Landbouwmachinefabriek B.V., Netherlands

[21] Appl. No.: 310,047

[22] Filed: Feb. 10, 1989

[30] Foreign Application Priority Data

Feb. 23, 1988 [DE] Fed. Rep. of Germany ....... 8802337
Jan. 11, 1989 [EP] European Pat. Off. ......... 89100432.7

[51] Int. Cl.$^5$ .............................. B30B 5/04
[52] U.S. Cl. ...................... 100/87; 100/88; 56/341
[58] Field of Search .............. 100/5, 40, 76, 87, 88, 100/89; 56/341-343

[56] References Cited

U.S. PATENT DOCUMENTS

| | | | |
|---|---|---|---|
| 1,027,393 | 5/1912 | Brown | 100/5 X |
| 1,648,246 | 11/1927 | Taft | 100/40 |
| 2,336,491 | 12/1943 | Luebben | 100/5 |
| 3,815,345 | 6/1974 | Mast et al. | 56/341 |
| 3,911,641 | 10/1975 | Miller et al. | 100/5 X |
| 4,092,818 | 6/1978 | Brewster | 100/5 X |
| 4,164,177 | 8/1979 | Canfield | 100/40 |
| 4,258,619 | 3/1981 | Gaeddert | 100/88 |
| 4,550,557 | 11/1985 | Vissers et al. | 56/341 |
| 4,602,471 | 7/1986 | Gray et al. | 100/40 X |

FOREIGN PATENT DOCUMENTS

| | | | |
|---|---|---|---|
| 0213219 | 3/1987 | European Pat. Off. | 100/88 |
| 2634638 | 2/1978 | Fed. Rep. of Germany | 56/341 |
| 2808244 | 8/1979 | Fed. Rep. of Germany | 56/341 |
| 3016674 | 12/1981 | Fed. Rep. of Germany | 100/88 |
| 3107744 | 9/1982 | Fed. Rep. of Germany | . |
| 3231741 | 3/1984 | Fed. Rep. of Germany | 100/88 |
| 3234455 | 3/1984 | Fed. Rep. of Germany | 56/341 |
| 3237935 | 4/1984 | Fed. Rep. of Germany | 56/341 |
| 3602289 | 7/1987 | Fed. Rep. of Germany | 100/88 |
| 3617155 | 11/1987 | Fed. Rep. of Germany | 100/88 |
| 2460099 | 2/1981 | France | 56/341 |

*Primary Examiner*—Timothy F. Simone
*Assistant Examiner*—Stephen F. Gerrity
*Attorney, Agent, or Firm*—Laff, Whitesel, Conte & Saret

[57] ABSTRACT

In order to retain the press element (9) in a roll baling press (1) in a stable shape corresponding to the minimum size of the press chamber after a movable part (3) of the press has been closed, the press element (9) consists of an inherently stiff rubber or plastic web capable of forming a self-supported loop (SM) corresponding to the minimum size of the press chamber. At the beginning of the winding operation there is thus no interference by laterally disposed components, resulting in optimum operating conditions.

11 Claims, 2 Drawing Sheets

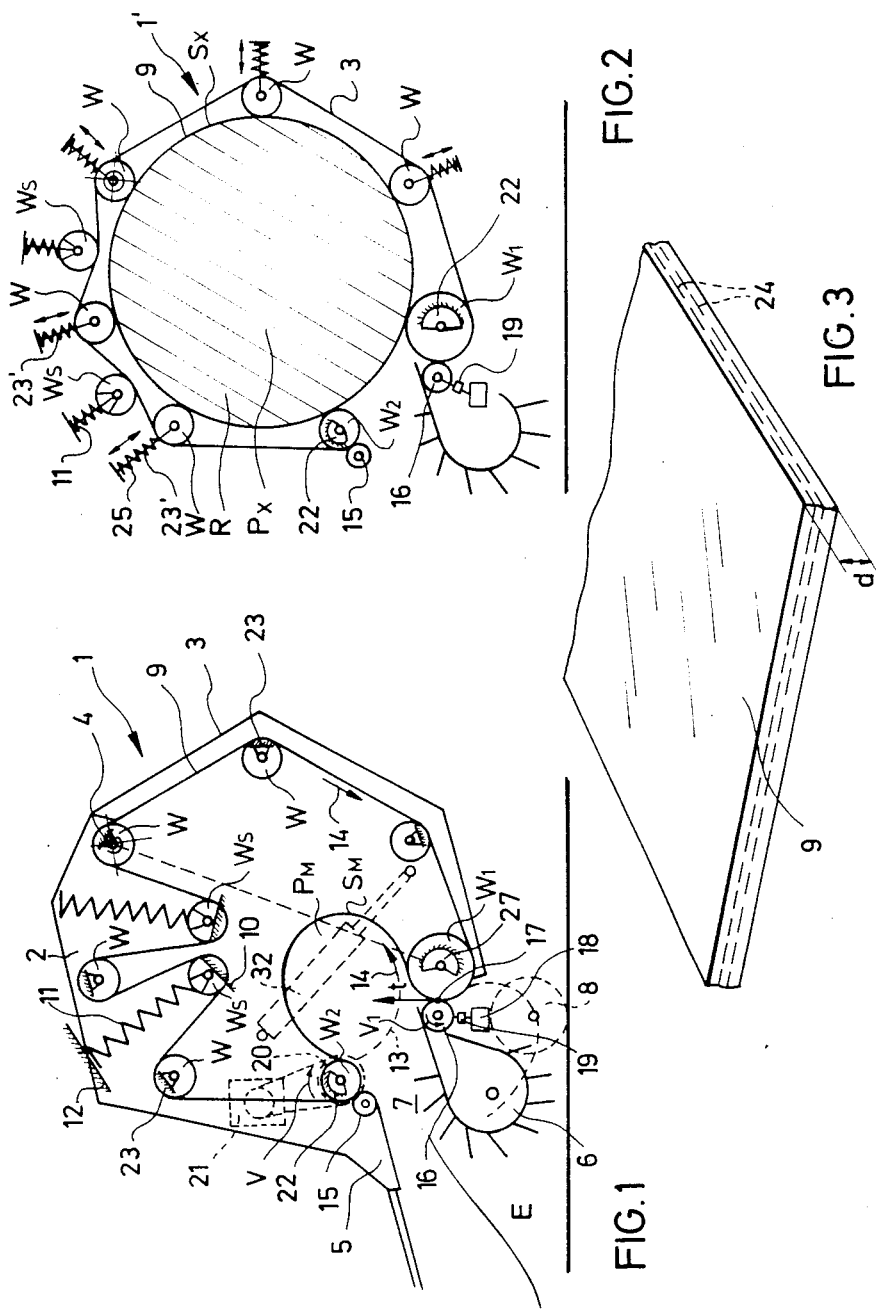

ROLL BALING PRESS

BACKGROUND OF THE INVENTION

The present invention relates to a roll baling press.

In a roll baling press known from EP-A-No. 1,156,041, the press element is an endless web consisting of two lateral link chains and a plurality of transverse rods extending therebetween. The press element is guided on a plurality of spaced rollers in the circumferential direction of the press chamber. Provided adjacent the inlet of the press chamber are two return rollers for the formation therebetween of a loop the size of which increases up to the maximum size of the press chamber. In the empty and closed state of the press chamber, the press element is supported by cam members engaging it from lateral directions, so that the loop is retained in a state corresponding to the minimum size of the press chamber. After the winding of the harvest product in the press chamber has been started, resulting in the formation of a roll bale of increasing size, the press element forming the loop is lifted off the cam elements and subsequently supported by the roll bale. During this stage the winding operation and the rotation of the roll bale are gravely hampered by the lateral engagement of the cam members.

In other known roll baling presses having a variable-volume press chamber, the press chamber is defined by a plurality of belts extending side by side. In the empty and closed state of the press chamber it is then extremely difficult to support the belts in such a manner that the start of the roll bale winding operation is not hampered and that none of the harvest product drops out between the belts.

A roll baling press having a variable-volume press chamber as known from U.S. Pat. No. 23 36 491 is provided with two endless press elements each consisting of a single web of a flexible material. A gap formed between the two press elements at the outlet side always permits a certain amount of the harvest product to be entrained outwards as the roll bale is being wound. At the beginning of the winding operation there is no press chamber of minimum size available, so that the initial winding of the core of the roll bale to be formed is retarded, resulting in localized excessive compaction or in a backup of the harvest product, respectively. This roll baling press is not capable of continuous operation, because the harvest product feed has to be interrupted by stopping the roll baling press as the finished roll bale is being tied and ejected.

BRIEF DESCRIPTION OF THE INVENTION

It is an object of the invention to provide a roll baling press of the type defined above, in which the shape of the press chamber at the minimum size thereof is stabilized by a structurally simple arrangement, and wherein the winding of a roll bale proceeds without hampering at the beginning of the winding operation. The roll baling press should in addition be capable of a continuous operation.

Since the inherent stiffness of the press element ensures that the loop is kept standing in an open state corresponding to the minimum size of the press chamber, the harvest product fed to the press chamber at the beginning of the winding operation of a new roll bale immediately encounters ideal conditions for the formation of a uniformly wound core. The standing loop defining the minimum size of the press chamber establishes a cylindrical shape, which is important for the uniform compaction of the harvest product. Since the retention of the loop at the minimum size of the press chamber does not require any lateral-engagement components, the beginning of the winding operation is not interferred with at these critical locations. The continuous or endless rubber or plastic web acting as the press element offers a relatively smooth surface to the harvest product, thus preventing the harvest product from getting caught and from escaping from the press chamber. During the entire winding operation the harvest product is subjected to uniform pressure in the radial direction, resulting in effective compaction and a desirably smooth circumferential surface of the roll bale. Although the inherent stiffness of the press element permits it to be guided around the rollers adjacent the inlet, it is still sufficient for preventing the loop defining the minimum size of the press chamber from collapsing. It is thus possible to establish a large-volume and large-width press chamber capable of the formation of high-quality large-sized roll bales.

In connection with the specific construction of the press element, the long feed passage permits a continuous operation of the roll baling press by enabling the harvest product which is taken up as the finished roll bale to be temporarily prestored therein as it is being tied and ejected.

The rubber or plastic web acting as the press element is suitably provided with reinforcing layers imparting it with the requisite tensional strength and the desired inherent stiffness. The reinforcing layers may be in the form of fabric layers or wire mesh layers of the type employed in V-belts or tires, such layers being vulcanized or bonded within the rubber or plastic web below the free surface thereof.

The press element is preferably of a high tensional strength, permitting it to be maintained under a preselected tension to exert a high compaction pressure on the roll bale without requiring all of the rollers to be employed for contributing to the generation of pressure. The high bending stiffness in the transverse direction facilitates the support of the press element at its boundary areas and prevents the press element from sagging at its transverse center portion when the press chamber is empty or when the longitudinal tension of the press element is temporarily reduced during the opening and closing operation of the press chamber.

According to another important aspect of the invention, the preselected tension has to be absorbed by only two of the rollers. The remaining rollers are not subjected to any loads, or only to reduced loads, during the winding and compacting operation. As a result, the roll baling press requires a reduced number of rollers to thereby reduce the production costs and assembly operations in the manufacture of the roll baling press. This provision also results in the additional advantage that the rolling drag generated at the outer circumferential surface of the roll bale is reduced, resulting in reduced loads acting on all of the mechanical components of the press.

In an alternative embodiment, the rollers may be supported in fixedly mounted bearings, resulting in a high compaction and thus in a high mechanical strength in the outer peripheral portion of the roll bale. This provision also permits the tensional forces acting on the press element to be reduced.

In accordance with another alternative embodiment, the radially displaceable loose bearings for the rollers permit a high compaction and a mechanically strong surface to be obtained in the circumferential portion of the roll bale irrespective of a relatively low tension of the press element. The rollers mounted in the loose bearings are subjected to very low or negligible bending stresses. A further advantageous effect is the reduction of the rolling drag of the roll bale.

In an advantageous embodiment, the two rollers on opposite sides of the inlet have parallel counter-rollers associated therewith to thereby define respective roller nips effective to retain the ends of the loop in the minimum-size state of the press chamber, as a result of which the inherent stiffness of the press element is effective to maintain the loop in its predetermined shape which is approximately that of a cylinder.

According to another advantageous aspect of the invention, the counter-roller is driven to rotate at a speed exceeding the angular winding speed so that, after the finished roll has been ejected and as the press chamber is being closed, the at least partially relaxing press element is advanced towards the loop adjacent the inlet at a greater speed than it is retracted from the inlet location, as a result of which the loop is rapidly formed to be available in the desired shape when the infeed of the harvest product is resumed.

According to another aspect of the invention, the driven counter-roller is located at a position adjacent the inlet, so that a tangent through the nip formed between it and the associated roller is directed towards the interior of the loop. As a result, the movement of the press element through the roller nip and the inlet has a directional component directed into the loop to be formed, so that the inherent stiffness of the press element acts to immediately impart the desired shape to the loop as it is being formed.

The drivingly rotatable counter-roller is preferably mounted in the stationary portion of the press, while the preferably freely rotatable roller is mounted in the hinged portion of the press chamber. By this provision it is ensured that the roller is entrained by the counter-roller as the loop is being formed, so that the frictional load acting on the press element is limited. This provision results in the further advantage that the roller mounted in the hinged portion of the press chamber is retracted from the counter-roller as soon as the roll bale has attained a size causing it to slightly lift the hinged portion of the press chamber off the stationary portion of the press.

It may also be advantageous to provide a friction slip clutch between the drive source and the counter-roller to thereby automatically ensure that the counter-roller is rotated only at the winding speed as soon as the loop has attained its correct minimum size. The friction clutch is suitably adjusted in such a manner that the torque of the counter-roller is insufficient for entraining the press element tensioning roller.

The counter-roller may advantageously be provided with a frictionally active surface to thereby ensure that the press element is effectively advanced towards the loop. In this case, however, it may be preferred to provide an overload clutch in the drive transmission for the counter-roller.

According to a further advantageous aspect of the invention, a separator element may be provided to result in a temporary storage function for the harvest product in an operating phase during which a finished roll bale contained in the press chamber is being wrapped in a tying material. The separator element acts to pre-store the harvest product to thereby permit the roll baling press to be continuously operated.

The separator element is preferably capable of deforming itself in the direction into the press chamber so as to contribute to holding the loop in the minimum size of the press chamber. This capability advantageously permits the separator element to use the press chamber for the pre-storing operation even when the press chamber is still partially filled by the finished roll bale in the act of being ejected. As soon as the finished roll bale has been ejected and the press chamber has been closed again, the separator element is retracted to thereby pass the already prepared winding core into the loop.

The separator element is adapted by means of a retainer to be moved across the feed passage to thereby interrupt the further supply of the harvest product to the press chamber at least temporarily, i.e. at least until the tying of the tying material around the finished roll bale has been finished. In this state the separator gradually yields to the pressure of the pre-stored harvest product as the latter continues to be supplied, to finally expand into the press chamber under the effect of the pressure exerted thereon by the harvest product.

The braking and/or retraction mechanism provided according to another aspect of the invention acts to control the compaction of the harvest product during the pre-storing stage and thus contributes to determining the buffer time available for wrapping and tying the tying material about the outer surface of the roll bale.

In accordance with still another aspect of the invention, a compression roller advantageously provided in the feed passage aids in compacting the harvest product as it continues to be supplied, to thereby provide the possibility of performing the pre-storing operation without requiring the dimensions of the feed passage to be altered relative to those of a conventional feed passage.

Embodiments of the subject matter of the invention shall now be described by way of example with reference to the accompanying drawings, wherein:

FIG. 1 shows a first embodiment of a roll baling press having a variable press chamber and fixedly mounted rollers, the press chamber being depicted empty and in its closed state, FIG. 2 shows a second embodiment of the roll baling press having a variable press chamber and floatingly mounted rollers, the press chamber being depicted in its filled and closed state, FIG. 3 shows a perspective sectional view of a detail and FIG. 4 shows a further embodiment of a roll baling press having a variable-size press chamber depicted in its closed state.

DETAILED DESCRIPTION

Figure 4:
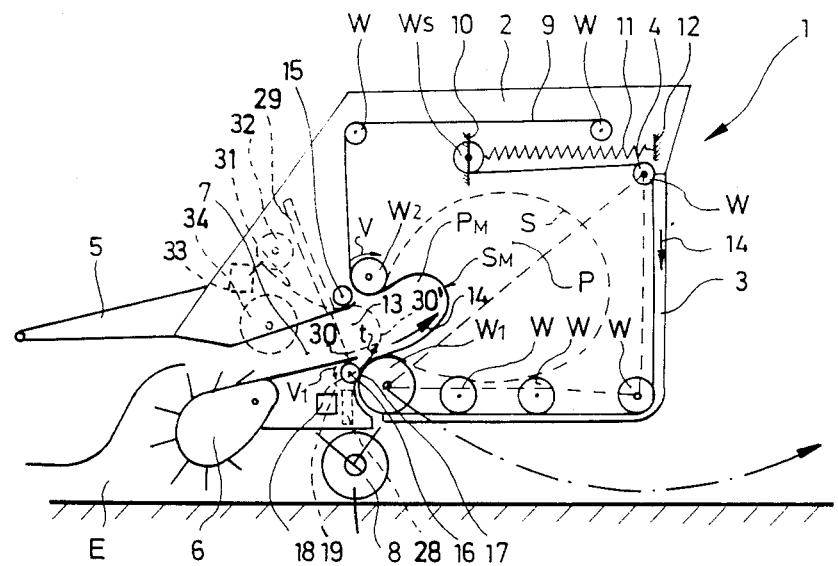

A first embodiment of a roll bale press 1 is shown in FIG. 1 in the closed state and with its press chamber empty. The press comprises a stationary part 2 and a rearwards openable hinged press chamber part 3 pivotable about a transverse axis 4. Stationary press part 2 is provided with a trailer bar 5, a pick-up drum 6 for picking up the harvest product E, and support wheels 8. A feed passage 7 extends slightly upwards to the press chamber PM having an inlet 13 opening thereinto. In the operative state shown, press chamber PM is defined by a loop SM of a web-shaped press element 9 supported and guided on a plurality of rollers W, WS, W1 and W2. There may be any number of rollers W. Press element 9 is deflected around rollers W1 and W2, roller W2 being rotatable in the winding direction (arrow 14) by means of a drive pulley 20 connected to a drive mechanism 21. Rollers WS are biased by springs 11 and movably guided between fixed stops 10 and 12 for maintaining press element 9 under tension. Loop SM defines press chamber PM at its minimum size, with tensioning rollers WS being supported on their respective stops 10.

Associated to rollers W1 and W2 are counter-rollers 15 and 16, respectively, so as to form roller nips 17 for clamping press element 9. Counter-roller 15 is disposed below a horizontal plane through the axis of roller W2, while counter-roller 16 is disposed above a horizontal plane through the axis of roller W1. In this manner it is ensured that a tangent t through nip 17 between counter-roller 16 and roller W1 is directed obliquely into loop SM. Counter-roller 16 is connected to a drive source 18, preferably with the interposition of a slip friction clutch 19.

As shown in FIG. 3, press element 9 is a rubber or plastic web having a thickness d of about 5 to 10 mm and extending over the full width of the press chamber. The rubber or plastic web is sufficiently flexible for permitting it to be deflecetd around rollers W1 and W2, but on the other hand has sufficient inherent stiffness for preventing the loop SM defining the minimum size of press chamber PM from collapsing and for maintaining press element 9 in its loop-shaped configuration. Press element 9 is also of high tensile strength and wear-resistant. For obtaining the desirable inherent stiffness, press element 9 contains reinforcing layers 24 vulcanized or otherwise bonded therein. These reinforcing layers may be formed of synthetic fiber fabrics or of metal wires or filaments of the type used in the reinforcing layers of V-belts or radial tires. The bending stiffness of press element 9 may be greater in the transverse direction than in the longitudinal direction.

With reference again to FIG. 1, press element 9 is driven by roller W2 at the winding speed V. Drive source 18 acts to rotate counter-roller 16 at a circumferential speed V1 which is higher than winding speed V. In nip 17 between counter-roller 16 and roller W1 there is thus a speed difference V1 - V for the section of press element 9 supplied to loop SM relative to the speed at which press element 9 is withdrawn from loop SM by roller W2 and its associated counter-roller 15.

Rollers W1 and W2 are mounted in stationary fixed bearings 22, one such fixed bearings 22 being optionally adjustable for increasing or decreasing the tension of press element 9. In the embodiment shown in FIG. 1, rollers W are likewise mounted in fixed bearings 23. Diagrammatically indicated at a location between stationary press part 2 and hinged press chamber part 3 is an operating cylinder 32 operable to open the press chamber for the ejection of a finished roll bale and to subsequently close it again.

The roll baling press shown in FIG. 1 operates as follows: Harvest product E supplied through feed passage 7 is formed to a winding core of a roll bale by rotation in the winding direction 14 at the winding speed V. As the supply of the harvest product continues, loop SM grows from its minimum size, resulting in the displacement of tensioning rollers WS towards stops 12 against the bias of springs 11. The pressure of the growing roll bale causes the loop to expand until it finally comes into contact with rollers W (FIG. 2). The press chamber is thus full. The loop has attained its maximum size SX corresponding to the maximum size PX of the press chamber. The tension of press element 9 may for instance be selected so that the loop comes only into light contact with rollers W, the roll bale being primarily compressed by the tension of the press element. This limits the rolling drag exerted on the press element by rollers W. When on the other hand a relatively low tension is selected for press element 9, rollers W act to compact roll bale R with an increasing pressure, the reaction forces acting on the rollers being absorbed by the fixed bearings 23 and transmitted therefrom to parts 2 and 3 of the press.

The roll bale R is subsequently tied in a tying material in a manner not shown, whereupon press chamber part 3 is pivoted rearwards and upwards about axis 4 until the finished roll bale drops from the press chamber. Rollers WS act to generate an additional ejection effect acting on the finished roll bale. During the ejection operation the loop is expanded and thereby released from engagement with rollers W. Tensioning rollers WS return to their position shown in FIG. 1 in contact with stops 10. As soon as press chamber part 3 is closed again, counter-roller 16 cooperates with freely rotatable roller W1 to advance the relaxed press element 9 towards inlet 13 at a speed which is greater than the speed at which the press element is retracted from the inlet region by the cooperation of counter-roller 15 with driven roller W2. The positioning of counter-roller 16 results in that the respective section of the press element is advanced in a predetermined direction, so that the loop SM defining the minimum size of the press chamber PM is rapidly formed to its proper shape. Since the ends of the loop are retained in the nips between counter-rollers 15, 16 and rollers W1 and W2, respectively, and due to the inherent stiffness of the press element, the loop quickly assumed the shape indicated in FIG. 1 and is thus immediately prepared to again receive the harvest product. The winding operation is then resumed in the manner described above.

As soon as loop SM has been properly formed, friction clutch 19 of counter-roller 16 starts to slip. It would also be conceivable to widen roller nip 17 during the formation of the roll bale by permitting the increasing pressure in the press chamber to slightly pivot hinged press chamber part 3 about axis 4, to thereby relieve the clamping action of roller nip 17 and thus reduce the friction between counter-roller 16 and press element 9.

FIG. 2 shows the final stage of the roll bale winding operation, with the loop at its maximum size SX and at the maximum size PX of the press chamber, immediately before hinged press chamber part 3 is to be lifted.

At the same time, FIG. 2 diagrammatically indicates a second embodiment of roll baling press 1', wherein rollers W are not mounted in fixed bearings as in FIG. 1, but rather in movable bearings 23' displaceable in radial directions against the bias of springs 25. This floating mounting permits rollers W to yield to the increasing pressure of the growing roll bale, so that the roll bale is essentially compacted by the tension of press element 9, while the rollers are only subjected to negligible bending loads. Depending on the tension prevailing in the interior section, and the reaction forces resulting therefrom in the circumferential direction and absorbed by the fixed bearings 22 of rollers W1 and W2, rollers W are able to automatically adjust themselves. The tensioning rollers WS are moved to positions closely adjacent stationary stops 12 or in contact therewith so as to contribute to maintaining the tension in press element 9. A satisfactory compaction of the roll bale is thus achieved thanks to the inherent stiffness and tensional strength of press element 9. The floating mounting of rollers W is effective to reduce the rolling drag during the roll bale winding operation. By way of a further advantage, a relatively small number of rollers W is sufficient for ensuring proper operation of the press, resulting in a reduction of the cost and weight of roll baling press 1'. The remainder the construction of the roll baling press 1' shown in FIG. 2 corresponds to the construction of the roll baling press 1 shown in FIG. 1.

FIG. 3 shows a diagrammatic sectional view of press element 9. It is formed as a rubber or plastic web having a thickness d in the range between 5 and 10 mm. Reinforcing layers 24 are vulcanized or bonded within the web and contribute to obtaining the requisite inherent stiffness and tensional strength. A press element 9 having sufficient inherent stiffness could also be formed of a flexible metal sheet, a wire mesh, a synthetic fiber fabric or the like, optionally with or without a rubber or plastic coating.

The embodiment of a roll baling press depicted in FIG. 4 is specifically suitable for continuous operation, i.e. it permits the pick-up of the harvest product to be continued during the relatively long period required for tying the finished roll bale with a tying material and for ejecting the finished and tied roll bale by providing means for the temporary pre-storage of the harvest product in the feed passage 7, and in part also within the press chamber, without collision with the finished roll bale. Parts identical with or corresponding to respective parts of the roll baling press 1 shown in FIG. 1 are designated by the same reference numerals in FIG. 4.

In contrast to the embodiment shown in FIG. 1, the roll baling press of FIG. 4 is provided with a tying material supply mechanism 28 shown in dotted lines at a location of stationary press part 2 adjacent counter-roller 16. Mechanism 28 is operable to supply a tying material (not shown), for instance in the form of a netting web, to the press chamber for wrapping around the finished roll bale prior to its ejection. In order to prevent the continuously fed harvest product from entering press chamber P while the tying material is being secured, i.e. after the free end of the tying material has passed inlet 13, the stationary press part 2 above feed passage 7 is provided with a retainer 29 for the free end 30 of a web-shaped separator element 31 wound onto a storage roller 32. Storage roller 32 is connected to a braking and/or retracting mechanism 33 for cooperation with separator element 31. Also provided in feed passage 7 for pre-storage purposes is a compression roller 34 connected to a not shown drive mechanism.

Shortly prior to closing and securing the tying material applied to the finished roll bale by tying material supply mechanism 28, that is, as soon as the leading end of the tying material reaches the inlet 13 again, retainer 29 is lowered across feed passage 7 until the free end 30 of separator element 31, which is releasably connected to retainer 29, extends fully across the feed passage 7. The separator element 31 then interrupts the further supply of the harvest product to press chamber P until the tying material has been closed and secured, optionally with its ends overlapping to a certain degree. As soon as the hinged press chamber 3 is then opened for initiating the ejection of the finished roll bale, the harvest product retained by the separator element 31 and compacted by compression roller 34 deforms the separator element from its original shape indicated by dotted lines at 31' by pushing it through inlet 13. The braking and/or retraction mechanism 33 acts on the separator element, which may be in the form of a flexible and tensionally strong web, to produce a corresponding retaining tension permitting the separator element to be deformed into the press chamber only to a predetermined degree. As a result, the harvest product is subjected to increasing compression, because the compression roller 34 acts to feed and thereby compress the product. This results in the creation of a buffer time sufficient for securing the tying material, for ejecting the finished roll bale and for closing hinged press chamber part 3 again. The compressed harvest product retained in separator element 31 may also be used for supporting press element 9 in the the shape of the loop SM defining the minimum size of the press chamber PM. In this case counter-rollers 15 and 16 may be omitted, because the pressure of the continuously fed harvest product is sufficient for supporting the press element 9 in the form of the loop SM of the desired shape.

After hinged press chamber part 3 has been properly closed, retainer 29 is retracted to thereby release the free end 30 of separator element 31. The retraction mechanism 33 acts to retract separator element 31 from the press chamber before the pressure of the harvest product causes the loop SM of press element 9 to expand towards the maximum size of the press chamber P. The separator element 31 of a flexible material could also be replaced by a rigid separator element, for instance a plate or partition to be extended across the feed passage. It would also be conceivable to provide two or more separator element adapted to be temporarily extended across the feed passage from above and below.

I claim:

1. A roll baling press for harvest products having a variable-volume press chamber with an interior periphery having an inlet for receiving the harvest products said press chamber being defined by a loop of an endless web-shaped press element supported on rollers, at least one roller being movably mounted for enabling the size of said loop to increase from a minimum size of said press chamber, said loop being supported on two rollers adjacent said inlet when at its minimum size, and at least one hinged press chamber portion being operable to open said loop for ejecting said roll bale, said web-shaped press element being a single inherently stiff web extending over at least the width of said press chamber, and in that said loop at its minimum size is kept standing by the inherent stiffness of said web, said two rollers being at opposite sides of said inlet and having parallel counter-rollers associated and cooperating with said two rollers to form roller gaps for said press element and being effective to keep said loop in a standing condition.

2. A roll baling press according to claim 1 wherein at least one of said two rollers at said opposite side of said inlet is rotatably driven with the bale-winding speed in the winding direction of said roll bale, and a leading counter-roller in the winding direction being adapted to be at least temporarily driven in the winding direction and at a speed exceeding winding speed.

3. A roll baling press according to claim 2 wherein said driven rotatable counter-roller is disposed at a position adjacent said inlet so that a tangent within a roller gap between said counter-roller and its said associated roller is directed into the interior of said loop.

4. A roll baling press according to any one of the claims 2 or 3 wherein said drivingly rotatable counter-roller is mounted in a stationary part of the press, and the roller associated with said rotatable counter-roller is mounted in a hinged press chamber portion.

5. A roll baling press according to claim 2 further comprising a drive source and said counter-roller having an adjustable friction clutch interposed therebetween.

6. A roll baling press according to claim 1, wherein one of said parallel counter-roller is a driven roller which has a frictionally active surface.

7. A roll baling press according claim 1 wherein, one of said parallel counter-roller is a driven roller mounted in a stationary part of the press, and a roller associated with said driven counter-roller is mounted in a hinged press chamber portion.

8. A roll baling press for harvest products, said press having a variable volume press chamber with an internal periphery defined by an endless web loop having a width equal to a width of said press chamber and being a material that is inherently stiff enough to self-form a minimum size loop for receiving said harvest product and compacting it into a bale, roller means for supporting said web, at least one of said roller means being movably mounted to enable said loops size to increase, means for opening said press to eject a bale of said harvest product from said press chamber, said web loop having an inlet at an open side of said loop, counter-roller means at opposite sides of said inlet for defining said inlet, said web passing between said counter-roller means, and means for rotatably driving said counter-roller at two different speeds, one of said roller means operating at the bale winding speed and another of said roller means operating at greater than said bale winding speed.

9. The roll baling press of claim 8 wherein said counter-roller means form a nip having a tangent directed into the interior of said loop.

10. The roll baling press of claim 8 wherein said counter-roller means is mounted in one stationary part of the press and an associated roller mounted in a press chamber position.

11. The roll baling press of claim 8 and means including a friction clutch for driving said counter-roller means.

* * * * *